Jan. 28, 1964   I. KARMIN   3,119,260
MEASURING INSTRUMENT OF THE RESOLVING TYPE
Filed Aug. 25, 1960   3 Sheets-Sheet 1

INVENTOR.
IRVING KARMIN
BY
ATTORNEYS

Jan. 28, 1964     I. KARMIN     3,119,260
MEASURING INSTRUMENT OF THE RESOLVING TYPE
Filed Aug. 25, 1960     3 Sheets-Sheet 2

INVENTOR.
IRVING KARMIN
BY
ATTORNEYS

Jan. 28, 1964 I. KARMIN 3,119,260
MEASURING INSTRUMENT OF THE RESOLVING TYPE
Filed Aug. 25, 1960 3 Sheets-Sheet 3

INVENTOR.
IRVING KARMIN
BY
ATTORNEYS

United States Patent Office 3,119,260
Patented Jan. 28, 1964

3,119,260
MEASURING INSTRUMENT OF THE
RESOLVING TYPE
Irving Karmin, 323 E. 10th St., New York, N.Y.
Filed Aug. 25, 1960, Ser. No. 51,926
17 Claims. (Cl. 73—189)

The invention relates to a measuring instrument of the resolving type. I have shown my invention hereinafter as embodied in the form of a resolving anemometer, i.e. a resolving wind gauge; however it is to be understood that such embodiment is by way of example only, the same simply constituting a convenient illustration of a highly practical form of the invention, and, accordingly, my invention is not to be limited to resolving anemometers except to the extent indicated by the appended claims.

Essentially my invention deals with a simple efficient compact low cost measuring instrument for resolving polar (vector) values into the orthogonal components. A uniquely practical embodiment of an instrument utilizing such a novel resolving arrangement is an isolated anemometer. By "isolated" I intend to denote an instrument which operates over prolonged spans of time, e.g. hours, days, weeks or months, without supervision, being located, for example, in a balloon or in an unmanned weather station. The data which is observed by such an isolated instrument is telemetered either continually, or at programmed times or on demand to a data collection point or is collected after a period of time by physical observation, e.g. visual reading of the instrument.

Isolated anemometers presently employed for micrometeorological work conventionally yield continuous traces of wind speed and wind direction. These traces appear as inked curves on a paper chart and are traced by pins electrically connected to the output of appropriate transmitters therefor. One axis of the chart represents wind speed or wind direction and the other axis is a function of time. For a statistical analysis of micrometeorological conditions time averages of this information are needed. With the conventional instrument charts described above the computation of these averages is time consuming. A more serious drawback is that such isolated instruments which are left unattended for substantial periods of time drift out of calibration due to battery drain; i.e. although the time axis may be maintained accurately the values along the wind speed and wind direction axes will fluctuate with battery voltage. The meaningful recovery of recorded information is difficult under these circumstances.

It is an object of my invention to avoid the aforesaid drawbacks.

It is another object of my invention to provide a measuring instrument of the character described which will supply the information in a digital fashion rather than as an analog whereby fluctuation in battery voltage will not affect the accuracy of the recorded information.

It is another object of my invention to provide a measuring instrument of the character described which will reduce the angular value of a polar coordinate to its corresponding orthogonal values so that this angular value can be recorded orthogonally in an accurate manner unaffected by fluctuation in battery voltage.

It is another object of my invention to provide a resolving anemometer which will record wind direction in a digital fashion by reduction to its orthogonal components.

It is another object of my invention to provide a resolving anemometer which will concurrently record wind direction and wind speed broken down into its cardinal components, i.e., north, east, south and west.

Other objects of my invention in part will be obvious and in part will be pointed out hereinafter.

My invention accordingly consists in the features of construction, combinations of elements, and arrangements of parts which will be exemplified in the instruments and systems hereinafter described, and of which the scope of application will be indicated in the appended claims.

In the accompanying drawings, in which are shown various possible embodiments of my invention.

In general I carry out my invention by providing plural orthogonal read-out means, e.g. four read-out means each of which corresponds to a different cardinal point, i.e., north, east, south and west, and by further providing a means which is responsive to a varying angular value, e.g. a member which is mounted to turn through these four cardinal points as well as through angular positions in the quadrants between the cardinal points. In addition, I provide means for generating trains of pulses which are sine and cosine functions of the angular position of said member and I feed these pulses to the appropriate read-out means as a function of the quadrant within which the member is located and as a momentary function of the angular position of the member within the quadrant.

Thus, by way of concrete example, if the member is located in the 0° position, i.e. if the angular polar coordinate of the member is 0° or, phrased differently, if the member is at the north position, the train of pulses which is generated will be fed only to the north read-out means and will be the cosine of 90° times the basic repetition rate of the pulses. If the member swings to a northeast position it will be located at 45° and, therefore, be in the first quadrant. The north and east read-out means will be connected to the pulse generating means and will receive pulses at the rate of the cosine and sine of 45°, respectively, times the basic repetition rate of the pulses. If the member is located in a north by north-east position, the member still will be in the first quadrant, but at 22½°, so that the north and east read-out means are connected to the means generating the trains of pulses, and pulses will be fed to the north read-out means at a rate which is the cosine of 22½° times the basic repetition rate and into the east read-out means at a rate which is the sine of 22½° times the basic repetition rate. If the element swings to a southwest position it will be in the third quadrant and at an angle of 225°; the means for generating the trains of pulses will be connected to the south and west read-out means, feeding these read-out means at the basic repetition rate of the pulses times the cosine and sine, respectively, of 45° (180° plus 45°), since the read-out means are all positive in operation although two of them are inherently negative, i.e. the south read-out means essentially is the negative of the north read-out means and the west read-out means essentially is the negative of the east read-out means.

It will be appreciated that the resolving instrument can be purely mechanical or purely electrical or can be partially mechanical and partially electrical. Thus the pulses may be reciprocating strokes of a physical element and the read-out means may be a mechanical counter, or the pulses can be waves, i.e. electrical pulsations, and the counter can be operatively responsive to these waves, i.e. an electrically responsive counter. Alternatively the pulses can be electrical in nature, i.e. waves, and the waves can be converted into movement of a mechanical member, as with a relay, which in turn actuates a mechanical counter.

It also will be apparent as the description proceeds that I may provide a primary means for generating a first train of pulses at a basic repetition rate and that I may provide a plurality of secondary means for derivatively generating trains of pulses at rates which are sine and cosine functions of the basic rate, selected outputs of the secondary means being fed to selected read-out means as a function of the quadrant in which the member is located and as a function of the angular position of the member within such quadrant. The means for generating the basic train of pulses and the secondary means for generating the sine and cosine trains of pulses may be either mechanical or electrical. Moreover, the means for generating the sine and cosine trains of pulses may either be operable in dependence upon the primary means for generating the basic repetition rate of the pulses or they may be operable independently thereof but keyed to the basic repetition rate of the primary train.

Furthermore the primary means for generating the basic rate of repetition of the pulses may generate pulses at a fixed rate, e.g. by means of a constant speed motor, in the event that the resolving instrument only is to perform a simple resolution of position, i.e. polar position, or it may generate pulses at a basic repetition rate which is variable as a function of the radial length of a polar coordinate (vector) to be resolved so that the ultimate resolution fed into the various read-outs means will take into account both the length and angular position of the polar coordinate (value). This arrangement is particularly useful in a resolving anemometer as it thereby will permit integration over a long period of time or orthogonal components of complete wind measurements taking into account both absolute wind speed and wind direction.

It further should be mentioned that the orthogonal read-out means may either be of a summing type, this being desirable, for instance, when the instrument is to be read only intermittently, or it may be of an instantaneous type, e.g. when the instrument is to be telemetered. It is also within the scope of my invention for the read-out means to be visual, particularly if the same is located at a manned station. Alternatively the instrument may include a printing mechanism so that records may be made in accordance with some selected program, as with the aid of a programming timer. Finally, it will be apparent that in addition to the read-out means for the cardinal points I also may include an absolute value read-out means for making a reading of the absolute value, i.e. the length of the polar coordinate (vector) being measured regardless of its direction.

In the preferred forms of my invention about to be described I provide a primary means for generating a train of pulses at a basic repetition rate which either may be fixed or variable depending upon whether or not the length of the polar coordinate is to be measured and I further provide a plurality of secondary generating means which generate plural trains of pulses at repetition rates which are sine and cosine functions of the basic repetition rate, there further being included a signal path selector switch to connect the outputs of a selected one or of a selected pair of sine and cosine trains to a selected one or a selected pair of read-out means, the selected read-out means being picked, i.e. a function of (responsive to) the quadrant in which an angularly shiftable member is located and the selected sine and cosine trains being a function of the particular angular location of the member within the aforesaid quadrant.

Referring now in detail to the drawings, and more particularly to FIGS. 1-5 in which I have shown one of the embodiments of my invention, the reference numeral 10 denotes a resolving anemometer which is constructed to operate in accordance with principles enunciated above. Said anemometer includes a hollow cylindrical casing 12 from which there depends a mounting stand 14 which is adapted to be suitably supported, as on a pipe or easel, in some unmanned location.

Figures 1, 2, 3:
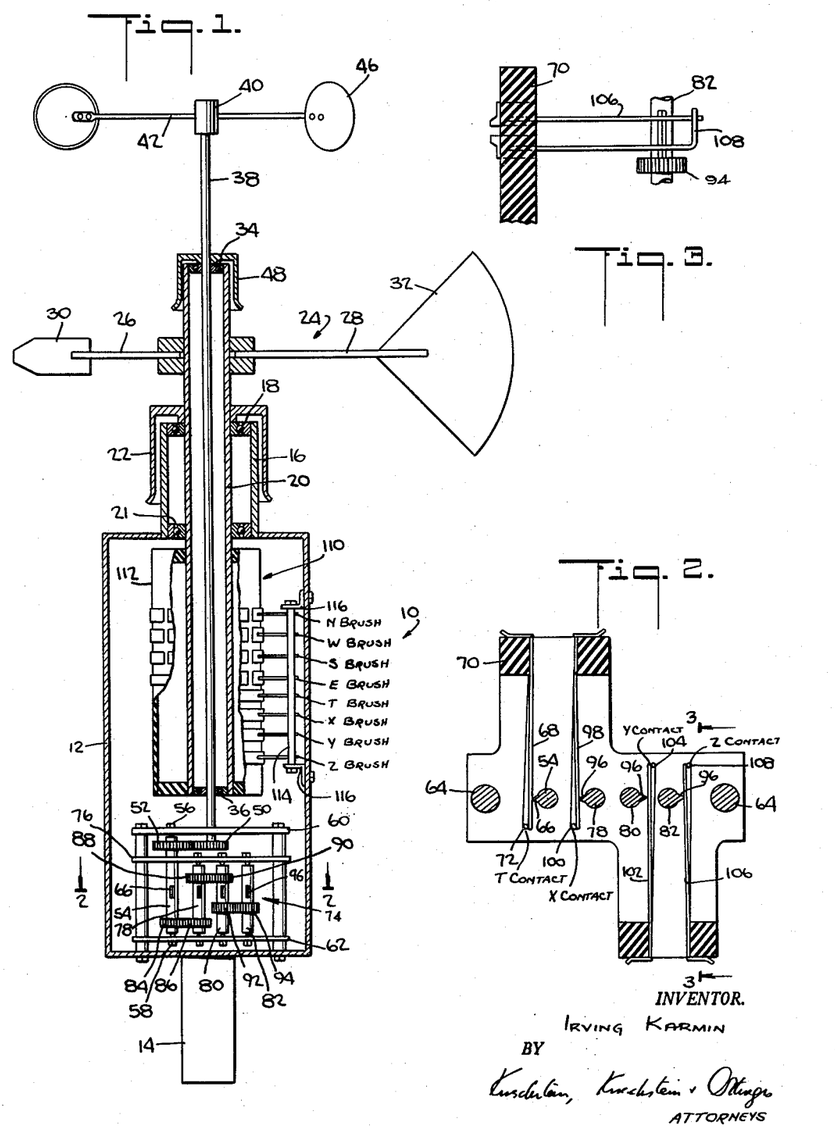
FIG. 1 is a vertical sectional view through a resolving anemometer constructed in accordance with my invention.
FIG. 2 is an enlarged sectional view taken substantially along the line of 2—2 of FIG. 1.
FIG. 3 is a sectional view taken substantially along the line of 3—3 of FIG. 2.

Extending upwardly from the top wall of the cylindrical casing 12 is an erect tubular sleeve 16 at the upper end of which I provide a rotatable anti-friction bearing 18, e.g. a ball bearing including an outer race fast to the sleeve 16, an inner race and a series of balls which hold said races apart. The inner race is fast on a vertical hollow shaft 20, which is coaxial with the vertical center of the casing 12 and extends from a region well within the casing 12 to a region well above the casing and well above the sleeve 16. The sleeve and shaft also are rotatably interconnected by a second ball bearing 21 near the bottom of the sleeve. To protect the interior of the casing and also the ball bearing 18 I include an inverted cup shield 22 the top of which covers the ball bearing 18 and top of the sleeve and the skirt of which surrounds the upper portion of the sleeve. By virtue of the ball bearings 18, 21 which have vertical axes of rotation the shaft 20 is free to turn about a vertical axis.

Mounted on the shaft 20 is a wind vane 24 constituting a pair of registered rods 26, 28 located on diametrically opposed sides of the shaft 20 and extending at right angles thereto so that the rods 26, 28 in effect constitute a single rod intersecting the shaft and disposed in a horizontal plane. Conventionally the rod 26 is shorter than the rod 28 and the rod 26 carries at its forward tip a pointer weight 30 shaped to provide low wind resistance e.g. bullet-shaped. At the rear end of the rod 28 there is mounted a plane vertical element 32 shaped to provide a low wind resistance in the direction of the rods 26, 28 and a high wind resistance in a direction perpendicular to the length of said rods whereby the rods 26, 28 will, in the usual manner of a wind vane, align themselves in the direction of the prevailing wind with the weight 30 headed into the wind and the element 32 trailing. The shaft 20 and wind vane 24 conjointly constitute the member earlier alluded to which is mounted to turn through the four cardinal points of the compass as well as through angular positions between these cardinal points. Specifically, the weight 30 determines the angular, i.e. polar, position of the member whose position is angularly variable inasmuch as said member seeks the wind direction. That is to say, if the wind is blowing from the northeast the weight 30 will lie in northeast quadrant while the element 32 will lie in southwest quadrant. In other words the wind vane 24 constitutes a means responsive to the direction of the local wind.

Various means may be utilized, as has been indicated above and as will be detailed hereinafter, to select the orthogonal read-out means which are operable at any given position of the wind vane and to select the particular sine and cosine function trains that are to be connected to the selected read-out means.

The hollow wind vane shaft 20 has a ball bearing 34 at its upper end and another ball bearing 36 at its lower end. Each ball bearing includes an outer race fast to the shaft 20 and an inner race, as well as sets of balls holding the two races apart. The two inner races are in vertical alignment and are secured to a wind velocity spindle 38 that runs through the hollow shaft 20 and protrudes from both ends thereof. The upper end of the spindle 38 bears a hub 40 from which radial arms 42 extend, said arms lying in a common horizontal plane. On the tip of each arm I mount an anemometer cup 46. These cups are of conventional conical shape such as are well known in the art. The open sides of all the cups face in the same circumferential direction. With this arrangement the shaft 38 will rotate at a rate which is a function of the absolute velocity of the local wind, regardless of its polar direction. The cups and spindle are calibrated so that the wind speed is known for any given rate of rotation of the spindle 38. Said cups and spindle jointly constitute a means which is sensitive to (measures) wind velocity just as the wind vane and hollow shaft 20 constitute a means which is sensitive to (measures) wind direction. It should be mentioned at this point that both said means are conventional per se and that any alternate means for accomplishing the same result can be utilized in carrying out my invention.

An inverted cup shield 48 protects the upper end of the hollow shaft 20.

The means for generating a first, i.e. primary train of pulses having a repetition rate which is a function of absolute wind velocity in part includes the means sensitive to absolute wind velocity and in part includes transducing means for converting the rate of rotation of the velocity spindle 38 into a train of electric waves of a frequency that is responsive to said rate of rotation.

Said transducing means comprises a gear 50 fast on the lower end of the spindle 38 and in mesh with a gear 52 secured on an absolute velocity shaft 54. The upper and lower ends of said shaft 54 are journalled in needle bearings 56, 58 carried by plates 60, 62 that are mounted on a plurality of posts 64 extending up from the bottom wall of the hollow casing 12. The ratio of the gears 50, 52 is of no particular concern and in the instrument 10 illustrated herein is one-to-one.

The absolute velocity shaft 54 has fastened thereon a sleeve including a cam 66, said sleeve and cam being fabricated from an electrically nonconductive material, e.g. a phenol formaldehyde condensation resin. Lying in the path of travel of the tip of said cam is the free end of an electrically conductive cantiliever leaf spring 68 which is supported by an electrically nonconductive post 70. When the spring 68 is out of engagement with the tip of the cam 66 it (the spring) is spaced from a stationary electrically conductive contact 72. However, when the leaf spring is engaged by the tip of the cam, once for each revolution of the shaft 54, said spring will be flexed to abut the contact 72 and thereby close an electric circuit through said spring and contact. Each time the electric circuit is closed and opened one electric wave, i.e. one electric pulse, will be generated so that it now will be apparent that the rate of pulses generated by rotation of the absolute velocity shaft 54 is a function of wind velocity. The electric circuit associated with the moving contact (the leaf spring 68) and the stationary contact 72 will be described in more detail hereinafter.

The means for generating a plurality of sine and cosine trains of pulses, i.e. trains of pulses the repetition rates of which are sine functions and cosine functions of the basic repetition rate of the train of pulses generated by opening and closing the contacts 68, 72, comprises a gear box 74 supported between the plate 62 and a plate 76 the latter being mounted on the posts 64.

The gear box includes three shafts 78, 80 and 82, one for each derivative sine and cosine function. In the form of my invention now being described I generate three derivative trains of sine pulses and three derivative trains of cosine pulses (exclusive of the basic pulse train which is a function of the cosine of 0° and exclusive of the absence of pulses which is a function of the sine of 0°) inasmuch as the anemometer is arranged to resolve into orthogonal components the polar coordinates between the cardinal points at three equidistant angular positions, to wit 22½°, 45° and 67½°. I have mentioned this to make it clear that the number of shafts 78, 80 and 82 which is illustrated is by way of example only and my invention contemplates the use, if desired, of additional shafts if the angular positions are to be closer together.

A gear 84 on the absolute velocity shaft meshes with a gear 86 on the first sine-cosine shaft 78. These gears have a ratio such that the shaft 78 has a rate of rotation which is 0.923 times the rate of rotation of the absolute velocity shaft 54. To this end the gear 84 has 22 teeth and the gear 86 has 24 teeth. The first sine-cosine shaft 78 has mounted thereon another gear 88 which meshes with a gear 90 on the second sine-cosine shaft 80. The gear ratio of the gears 88, 90 is such, keeping in mind the gear ratio of the gears 84, 86, that the second sine-cosine shaft 80 will turn at a rate which is 0.707 times the rate of rotation of the absolute velocity shaft 54. To accomplish this the gear 88 has 14 teeth and the gear 90 has 18 teeth. The second sine-cosine shaft 80 has fastened thereon a gear 92 that meshes with a gear 94 on the third sine-cosine shaft 82. The gears 92, 94 are so proportioned as to turn the third cosine shaft at a rate which is 0.383 times the rate of rotation of the absolute velocity shaft 54. To achieve this the gear 92 has 12 teeth and the gear 94 has 22 teeth.

It now will be apparent that when the absolute velocity shaft 54 turns once per unit of time (the equivalent of the cosine of 0° and the sine of 90°) the first sine-cosine shaft will turn 0.923 revolution per unit of time this being the cosine of 22½° and the sine of the complemental angle, i.e. the sine of 67½°. Concurrently the second sine-cosine shaft 80 will turn 0.707 revolution per unit of time this being the cosine and sine of 45°. Moreover the third sine and cosine shaft will at the same time turn 0.383 revolution per unit of time this being the cosine of 67½° and the sine of the complemental angle 22½°. As soon will be seen the three sine-cosine shafts 78, 80, 82 are arranged to generate one pulse and, more particularly, one electric wave for each revolution of each shaft so that the first sine-cosine shaft 78 will generate pulses at a rate with respect to the basic rate which is equal to the cosine of 22½° and the sine of 67½°. The second sine-cosine shaft 80 will generate pulses at a rate with respect to the basic rate which is equal to the sine and cosine of 45°. The third sine-cosine shaft 82 will generate pulses at a rate with respect to the basic rate which is equal to the cosine of 67½° and the sine of 22½°.

The turning of each of the sine-cosine shafts is transduced from rotary motion to pulses in a manner similar to that employed for the absolute velocity shaft. That is to say, each of the sine-cosine shafts 78, 80, 82 is provided with a Bakelite cam 96 which flexes a leaf spring against a stationary contact or permits it to spring away therefrom.

Referring to FIG. 2, the first sine-cosine shaft 78 actuates a movable (leaf spring) contact 98 with respect to its stationary contact 100; the second sine-cosine shaft 80 actuates a movable contact 102 with respect to its stationary contact 104; and the third sine-cosine shaft 82 actuates a movable contact 106 with respect to its stationary contact 108. As pointed out above, these sundry pairs of sine-cosine contacts will generate electric pulses at rates with respect to the basic repetition rate which are sine and cosine functions of certain specific angles. The power for the pulses is supplied by a battery 109.

Purely as a matter of convenience, so that the electric circuit hereinafter to be described will be easy to follow, I will refer to the stationary contact 72 as the "T" contact, to the stationary contact 100 as the "X" contact, to the stationary contact 104 as the "Y" contact and to the stationary contact 108 as the "Z" contact.

The resolving anemometer 10 further includes means to select particular trains of sine-cosine pulses responsive to the direction from which the wind is coming and to connect these trains of pulses to orthogonal read-out means, soon to be described in detail, responsive to the quadrant from which the wind is blowing. That is to say said selecting and connecting means will, if for example the wind is blowing from north by northeast, select a train of pulses for the cosine of 22½° and another train of pulses for the sine of 22½° and will connect these trains to the orthogonal read-out means which bound the quadrant in which north by northeast lies, that is to say to the north read-out means and the east read-out means respectively. Carrying the example a step further said means will if the wind is blowing from west by southwest select a train of pulses which is the cosine of 67½° and another train of pulses which is the sine of 67½° and will connect these trains of pulses to the south and west read-out means respectively.

More particularly and as shown in the anemometer 10 now being described, the aforesaid means comprises a signal path selector switch 110 including a cylindrical drum 112 concentric with the absolute velocity spindle 38 and wind direction shaft 20 and mounted to turn with, i.e. be operationally integral with, said shaft 20. The drum 112 is a switching drum and for this purpose carries several switching contacts arranged in circumferential paths around the drum and several longitudinally spaced brushes each arranged to engage switching contacts in a different circumferential path. Each of the switching contacts constituting a conductive surface, e.g. a strip of brass foil secured to the drum with adhesive, the drum itself being electrically nonconductive. The brushes conveniently may be electrically conductive leaf springs mounted on a rod 114 of electrically nonconductive material that is supported, as by brackets 116, from the side wall of the casing 12. To effectively operate the instant embodiment of the invention eight brushes are used. For convenience in describing the electrical circuit these brushes will be respectively referred to as the "N" brush for the north read-out means, the "W" brush for the west read-out means, the "S" brush for the south read-out means, the "E" brush for the east read-out means, the "T" brush which is the brush associated with the "T" contact, the "X" brush which is the brush associated with the "X" contact, the "Y" brush which is the brush associated with the "Y" contact and the "Z" brush which is the brush associated with the "Z" contact.

Figure 4:
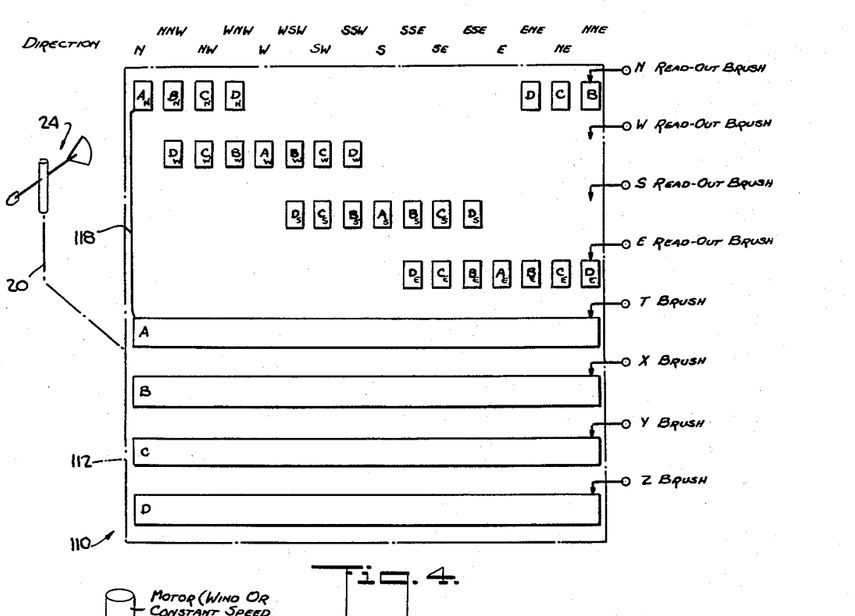
FIG. 4 is a developed view of the signal path selector switch shown in FIG. 1.

The arrangement of the contacts on the switching drum 112 is shown in developed form in FIG. 4. It there will be seen that each of the four lower contacts carried by the drum constitutes a complete (360°) circumferential path. The 360° circumferential contact associated with the T brush is denoted by the reference character A; the 360° circumferential contact associated with the X brush is denoted by the reference character B, the 360° circumferential contact associated with the Y brush is denoted by the reference character C and the 360° circumferential contact associated with the Z brush is denoted by the reference character D.

The N brush is associated with a set of short contacts, that is to say contacts which individually cover only a short circumferential arc. Each of these contacts covers an arc of almost 22½° and there are seven such contacts in the set associated with the N brush. The seven contacts are juxtaposed, that is to say they are immediately adjacent one another (although electrically discrete) in a circumferential path and thereby conjointly cover 157½°. These individual 22½° contacts associated with the N brush are so positioned on the drum 112 that they will successively be engaged by the N brush as the wind vane moves from west by northwest to and including east by northeast. Specifically, one of the 22½° contacts will be engaged by the N brush when the weight 30 is pointing to north. At this time the N brush will be disposed in the center of this 22½° contact which will here be denominated as $A_N$ meaning the central 22½° contact associated with the N brush. Therefore when the wind vane is within 11¼° of north to either side of north the $A_N$ contact will be engaged by the N brush. There are two $B_N$ contacts in the series of 22½° contacts associated with the N brush. One $B_N$ contact is disposed on one side of the $A_N$ contact and the other $B_N$ contact on the other side of the $A_N$ contact. Accordingly when one $B_N$ contact is engaged by the N brush the wind will be coming from north by northwest and when the other $B_N$ contact is engaged by the north brush the wind will be coming from north by northeast. Of course neither the north by northeast nor the north by northwest engagement of a $B_N$ contact with the N brush will mean that the wind is coming exactly from such direction inasmuch as each 22½° $B_N$ contact covers a variation in angle of 22½°. However the approximation has been found to be satisfactory. There likewise are two 22½° $C_N$ contacts respectively located in the northwest and northeast positions on the drum 112 and two 22½° $D_N$ contacts respectively on the west by northwest and east by northeast positions on the drum 112.

It is again to be noted that when I speak of any particular point of the compass and relate it to the position of a 22½° contact on the drum I mean to indicate that such 22½° contact has its center engaged by a N, E, S or W brush when the wind vane is in the indicated compass position and will continue to be engaged by such brush within approximately 11¼° to either side of such position.

There are, likewise, seven 22½° contacts associated with the W brush, seven 22½° contacts associated with the S brush and seven 22½° contacts associated with the E brush, these being denoted respectively as $A_W$, two $B_W$'s, two $C_W$'s, two $D_W$'s, $A_S$, two $B_S$'s, two $C_S$'s, two $D_S$'s, $A_E$, two $B_E$'s, two $C_E$'s and two $D_E$'s. The locations of the centers of all these 22½° contacts on the drum 112 is indicated on the chart below:

| Compass Point | 22½° Contact | Compass Point | 22½° Contact |
|---|---|---|---|
| N | $A_N$ | S | $A_S$ |
| NNE | $B_N, D_E$ | SSW | $D_W, B_S$ |
| NE | $C_N, C_E$ | SW | $C_W, C_S$ |
| ENE | $D_N, B_E$ | WSW | $B_W, D_S$ |
| E | $A_E$ | W | $A_W$ |
| ESE | $D_S, B_E$ | WNW | $D_N, B_W$ |
| SE | $C_S, C_E$ | NW | $C_N, C_W$ |
| SSE | $B_S, D_E$ | NNW | $B_N, D_W$ |

Suitable wiring is employed to connect each 360° circumferential A contact to all of the 22½° A contacts, to wit $A_N$, $A_W$, $A_S$ and $A_E$, to connect each 360° circumferential B contact to all of the 22½° B contacts, to wit, two $B_N$'s, two $B_W$'s, two $B_S$'s, and two $B_E$'s; each 360° circumferential C contact to all of the 22½° C contacts, to wit, two $C_N$'s, two $C_W$'s, two $C_S$'s and two $C_E$'s and each 360° circumferential D contact to all of the 22½° D contacts, to wit, two $D_N$'s, two $D_W$'s, two $D_S$'s and two $D_E$'s. It would be confusing, and therefore, pointless to show all of these wires in the developed contact drawings of FIG. 4 and, accordingly, I have only indicated one wire 118 running from the 360° circumferential A contact to the 22½° $A_N$ contact, this typifying all of the remaining wires.

From the foregoing it should now be apparent that when the wind vane is in any particular position the signal path selector switch will connect certain T, X, Y and Z contacts through the T, X, Y and Z brushes to certain N, W, S and E read-out brushes, but never more than two at a time of said read-out brushes. It further will be apparent upon reviewing the previous description that the informations read-out are natural cosine and sine functions times the basic rate of pulses of the absolute wind velocity shaft 54 and are assigned, i.e. connected, to the cardinal point read-outs in their proper orthogonal resolution values. For instance, if the wind vane 24 is in north position and the absolute velocity shaft is pulsing at a rate of 100 per unit of time, 100 pulses per unit of time will be fed from the T brush to the A contact then the $A_N$ contact and finally to the N read-out brush. If the absolute velocity shaft continues to generate 100 pulses per unit of time but the wind vane veers to different positions, the following pulses will be obtained:

| Wind Direction | North Read-Out Brush | West Read-Out Brush | South Read-Out Brush | East Read-Out Brush |
|---|---|---|---|---|
| N | 100 (A) | | | |
| NNE | 92.3 (B) | | | 38.3 (D) |
| NE | 70.7 (C) | | | 70.7 (C) |
| ENE | 38.3 (D) | | | 92.3 (B) |
| E | | | | 100 (A) |
| ESE | | | 38.3 (D) | 92.3 (B) |
| SE | | | 70.7 (C) | 70.7 (C) |
| SSE | | | 92.3 (B) | 38.3 (D) |
| S | | | 100 (A) | |
| SSW | | 38.3 (D) | 92.3 (B) | |
| SW | | 70.7 (C) | 70.7 (C) | |
| WSW | | 92.3 (B) | 38.3 (D) | |
| W | | 100 (A) | | |
| WNW | 38.3 (D) | 92.3 (B) | | |
| NW | 70.7 (C) | 70.7 (C) | | |
| NNW | 92.3 (B) | 38.3 (D) | | |

The contacts parenthetically indicated on the foregoing table are the 22½° and corresponding 360° contacts which feed pulses at the repetition rates corresponding to the sines and cosines of the associated wind headings.

It should be mentioned at this point that, as has been inferred earlier, the embodiment of my invention now being described, i.e. the instrument 10, averages out wind directions when resolving. That is to say it will treat all angular orientations of the wind within 11¼° to either side of north as north; similarly, it will treat all angular orientations of the wind within 11¼° of NNE as NNE etc. However, this range can be made smaller by increasing the number of means for generating sine and cosine pulse trains and reducing the size of the short contacts as the drum 112. For instance, if there are forty-four such means and eighty nine short contacts in each set then the angular deviation from true heading of the wind which will be read as the average heading of the wind will be within 1° to either side of the true heading. Nevertheless, as a practical matter I have found that the illustrated instrument gives good, i.e. satisfactory, results.

Figure 5:
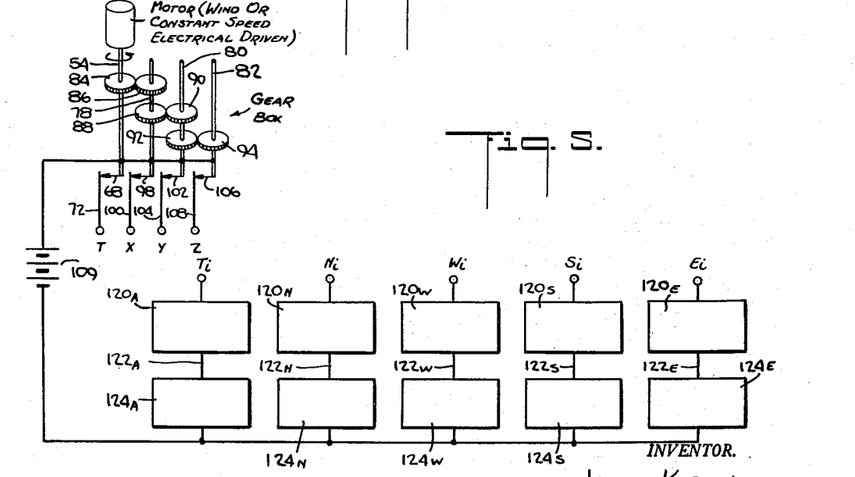
FIG. 5 is a schematic view of the electric circuit utilized in said anemometer, the same being employed in conjunction with the signal path selector switch illustrated in FIG. 4.

In FIG. 5 I have shown the electric circuit utilized in connection with the anemometer 10 the same being employed in conjunction with the signal path selector switch 110. In this circuit said switch 110 has been omitted, however the contacts T, X, Y and Z (the contacts 72, 100, 104 and 108) which are the outputs of the means for generating the sine and cosine trains, are shown.

Also shown in said circuit are the sundry orthogonal read-out means which I provide. These include a north read-out means, a west read-out means, a south read-out means, an east read-out means and an absolute velocity read-out means. The read-out means may take on any convenient form. For example, they may be instantaneous value read-out means such as an indicator hand and dial which gives the momentary rate of the information being supplied thereto. That is to say each read-out means simply may constitute a gauge which indicates the rate of the pulses (pulses per unit of time) fed to it. Such read-out means in this event can be visual, e.g. a pointer moving over a scale or a scale moving with respect to a pointer and may be electric, e.g. the voltage or frequency of an electric current. Alternatively each read-out means may be of the summing or cumulative type which indicates the total number of sine and cosine pulses fed to it over a period of time. In this event the read-out means can be purely mechanical, e.g. counters, or electro-mechanical, e.g. counters actuated by relays, or they may be of the meter type using eddy current motors. Further alternatively the readout means may be of the printing type which will print in response to a demand. The demand may be programmed, i.e. called for at certain intervals or the demand may be under the control of an operator at a station. Obviously, if desired, the read-out means may be combinations of the foregoing as for instance it may include an instantaneous readable scale and a visually readable summing counter which latter may be arranged to print the summed value whenever desired.

As shown herein in the instrument 10 each of the orthogonal read-out means comprises a relay 120 which is normally open, which closes upon the feeding of a pulse thereto and which reopens when the pulse terminates. The relay armature is mechanically connected as by a link 122 which shifts upon actuation of the relay to operate a mechanical counter 124. To distinguish between the different relays and counters characterizing subscripts have been associated therewith. Thus the relay for absolute velocity, has been noted by the reference numeral $120_A$, the associated link by the reference numeral $122_A$ and the associated absolute velocity counter by the reference numeral $124_A$. There are four more relays, to wit, the relays $120_N$, $120_W$, $120_S$, and $120_E$, four more connecting links, $122_N$, $122_W$, $122_S$ and $122_E$ and four more counters, $124_N$, $124_W$, $124_S$ and $124_E$. Each relay is provided with an input terminal these being indicated by the reference characters $T_i$, $N_i$, $W_i$, $S_i$, and $E_i$ respectively.

To understand the working of the circuit it must be appreciated that the output terminals T, X, Y and Z of the means for generating the sine and cosine pulses are selectively connected to the input terminals $N_i$, $W_i$, $S_i$ and $E_i$ by the signal path selector switch 110. Both the output terminal T and the input terminal $T_i$ are connected to the T brush of said switch. The output terminal X is connected to the X brush of said switch, the output terminal Y is connected to the Y brush of said switch and the output terminal Z is connected to the Z brush of said switch. The input terminal $N_i$ is connected to the N read-out brush of said switch, the input terminal $W_i$ is connected to the W read-out brush of said switch, the input terminal $S_i$ is connected to the S read-out brush of said switch and the input terminal $E_i$ is connected to the E read-out brush of said switch. Thereby the absolute velocity counter will have fed to it continuously the pulses generated by the absolute velocity shaft 54 so that the reading on the counter $124_A$ constitutes in integral, i.e. summation, of said velocity in the period of time between two readings. The average velocity will be the summed velocity reading on the counter $124_A$ divided by the period of time.

Purely by way of example if one hundred pulses per minute represents a wind velocity of ten miles per hour and if over a one hundred hour period the counter $124_A$ registers one million counts, the average velocity over this one hundred hour period will have been 16.7 miles per minute. If during this one hundred hour period the wind blew only from the north the selector switch would have remained in a position such that the 22½° contact $A_N$ would have been engaged by the N read-out brush. Therefore the T output contact would have been connected to the $N_i$ input terminal so that in the same period there would have been one million counts (pulses) registered via the relay $120_N$ and the link $122_N$ on the counter $124_N$.

If during the same one hundred hour period the wind had been blowing steadily within 11¼° of NNE, one million counts would have been registered on the counter $124_A$ and there would have been registered via a 22½° contact $B_N$ on the counter $124_N$, one million times 0.923 (the cosine of 22½°) and via a 22½° contact $D_E$ on the counter $124_E$ one million times 0.383 (the sine of 22½°).

In actual operation, of course, the wind will veer from time to time so that it will be an accumulation of counts on the orthogonal read-out counters $124_N$, $124_W$, $124_S$ and $124_E$ which can be translated by computation, as indicated above, into the average velocity of the wind from each of the cardinal points of the compass.

As indicated before the count may be taken from the counters by visually reading the totalized numbers on the counter dials as well as by having a printing type counter which prints the total count present in the counter at any selected moment.

Figure 6:
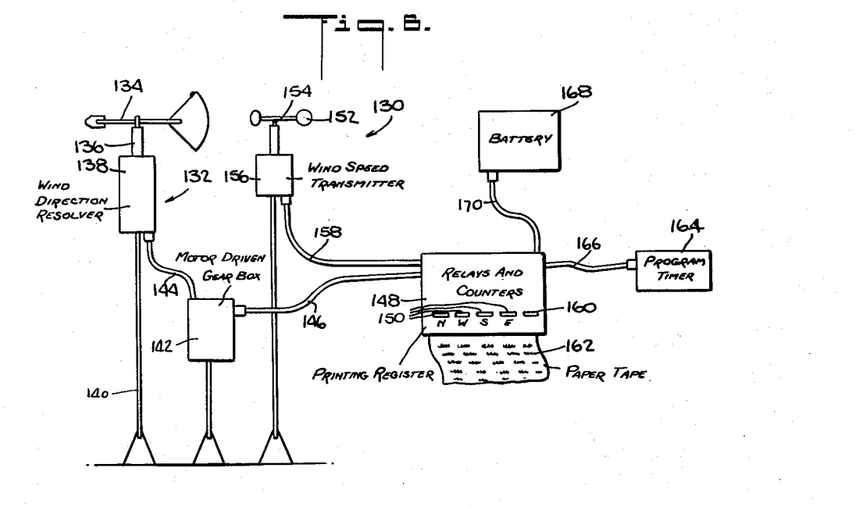
FIG. 6 is a schematic view of a resolving anemometer embodying a modified form of my invention.

In FIG. 6 I have shown a modified form of my invention constituting a resolving anemometer 130 which includes a printing counter. The components of this anemometer have been indicated schematically since the details of the sundry components have been described hereinabove. Said anemometer 130 includes a wind direction resolver 132 which comprises a wind vane 134 mounted on a shaft 136 that turns within a casing 138 housing a signal path selector switch such as the switch 110. The wind resolver is mounted on a tripod 140. There also is provided a tripod mounted casing 142 within which there is housed means for generating a plurality of trains of sine and cosine pulses of uniformly spaced angles, e.g. the cosine and sine of 0°, of 22½°, of 45° and of 67½°. Said pulse generating means is driven by a constant speed electrical motor (not shown). The means for generating the various trains of sine and cosine pulses is the same as the series of shafts 54, 78, 80 and 82 of the first described form of my invention, the shaft 54 being driven through a suitable gear train by the constant speed electrical motor as schematically shown in FIG. 5. An electrical cable 144 effects connections between the sine and cosine pulse train generating means and the signal path selector switch in the casing 138. The outputs from the signal path selector switch which for convenience have been fed back to the casing 142 are fed through a cable 146 to a casing 148 which houses the north, west, south and east orthogonal counters such as have been described with reference to FIG. 5. The number of counts present on these counters at any given time can be visually read through openings 150 in the casing 148. If desired, there may be a fifth output from the signal path selector switch corresponding to the T read-out but this would not have any meaning in terms of average absolute wind velocity since it has no relationship to such velocity. Indeed, this counter is entirely unnecessary if the constant speed motor is reliable since it merely will represent the number of revolutions of the output shaft of the step-down gear train associated with said motor.

For registering the absolute wind velocity I provide anemometer cups 152 mounted on a spindle 154 which turns within a tripod mounted casing 156 housing a make and break mechanism for generating a train of pulses which is a function of and is calibrated to the absolute wind velocity. These pulses are transmitted by a cable 158 to the housing 148 where they energize a relay that controls an absolute velocity counter the reading on which can be seen through an opening 160 in the housing 148. It should be pointed out that although the reading through the opening 160 can be translated directly into absolute average wind velocity, the readings through the openings 150 are only indicative of the average angular value of the wind resolved into the cardinal points of the compass. The counters contained in the casing 148 are entirely conventional and also include conventional printing mechanisms so that upon feeding of a control pulse thereto they will print their readings at any given time on a paper tape 162. Said control pulses are provided by a program timer 164 connected to the cable 166. Power for the entire system is furnished by a battery 168 the cable 170 from which runs to the casing 148 so that power is furnished to the other components through the cables 144, 146, 158 and 166 which also interchange intelligence between them in the manner aforesaid.

Figure 7:
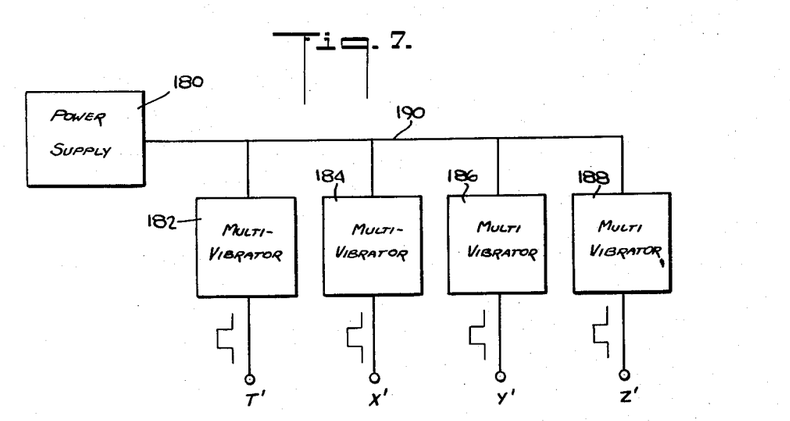
FIG. 7 is a portion of a circuit illustrating another modified form of my invention.

The trains of sine and cosine pulses do not have to be generated with the aid of mechanical elements such as revolving shafts and switches, and in FIG. 7 I have shown an alternate arrangement. Herein such pulses are generated electronically. In this figure the reference numeral 180 denotes a source of power and the reference numeral 182, 184, 186 and 188 denote different multi-vibrators.

The multi-vibrators are entirely conventional. They comprise for example, astable free-running collector-coupled transistor vibrators. These vibrators generate pulses at different rates which are selected for different sine and cosine functions. Thus for example the output from the multi-vibrator 182 is 100 pulses per minute; the output from the vibrator 184 is 92.3 pulses per minute; the output from the multi-vibrator 186 is 70.7 pulses per minute and the output from the multi-vibrator 188 is 38.3 pulses per minute. The pulses are conventional square wave pulses. The pulses from the multi-vibrator 182 are fed to an output terminal T', the pulses from the output terminal 184 are fed to an output terminal X', the pulses from the multi-vibrator 186 are fed to an output terminal Y' and the pulses from the multi-vibrator 188 are fed to an output terminal Z'. All the multi-vibrators are energized from the power supply through a lead line 190. The outputs from the terminals T', X', Y' and Z' are connected to the T, X, Y and Z brushes of the signal path selector switch 110 so that an instrument embodying the aforesaid multi-vibrators will feed pulses to the counters $124_N$, $124_W$, $124_S$ and $124_E$ (not to the counter $124_A$) at a rate which is determined by the position of the wind vane 24, it being understood that the counters under such circumstances provide information only as to the average angular position of the wind over a period of time and not to the orthogonal components of wind velocity. The electronic generation of pulses simplifies the use of a larger number of more closely spaced trains of sine and cosine pulses using, of course, a signal path selector switch with a greater number of different positions.

It will thus be seen that I have provided devices in which the several objects of my invention are achieved, and which are well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention, I claim as new and desire to secure by Letters Patent:

1. A measuring instrument of the resolving type, said instrument comprising four different counters the readings of which are representative of orthogonal signals, a first means responsive to a varying angular value, means for generating different pulse trains having rates that are equal to a basic rate times the sines of different particular angles and rates that are equal to the basic rate times the cosines of the same angles, and means under the control of said first means for feeding to two selected counters those sine and cosine pulse trains corresponding at any given time to the particular angle that then is closest to the angular value to which the first means is responsive, said selected counters being those corresponding to the quadrant in which the angular value then is located.

2. A measuring instrument of the resolving type, said instrument comprising four different counters the readings of which are representative of orthogonal signals, a member mounted to turn through four cardinal points each corresponding to a different one of the four counters and through angular positions in the quadrants between said cardinal points, means for generating different pulse trains having rates that are equal to a basic rate times the sines of different particular angles and rates that are equal to the basic rate times the cosines of the same angles, and means under the control of said member for feeding to two selected counters those sine and cosine pulse trains corresponding at any given time to the particular angle that then is closest to the angular position of said member, said selected counters being those corresponding to the quadrant in which the member then is located.

3. A measuring instrument of the resolving type, said instrument comprising four counters the readings of which are respectively representative of north, west, south and east signals, a member mounted to turn through the four cardinal points each corresponding to a different one of the four counters and through angular positions in the quadrants between said cardinal points, means to generate a first train of pulses at a basic rate, means to generate several secondary trains of pulses at different repetition rates that are equal to the basic repetition rate times the sines of different particular angles and rates that are equal to the basic repetition rate times the cosines of the same angles, and means under the control of said member for feeding to two selected counters those sine and cosine pulse trains corresponding at any given time to the particular angle that then is closest to the angular position of said member, said selected counters being those corresponding to the quadrant in which the member then is located.

4. An instrument as set forth in claim 3 wherein the means for generating pulses at the basic repetition rate generates pulses at a constant rate.

5. An instrument as set forth in claim 3 wherein the means for generating pulses at the basic repetition rate generates pulses at a variable rate.

6. An instrument as set forth in claim 3 wherein the means for generating pulses at a basic repetition rate generates pulses at a rate which varies responsive to a variable value.

7. A resolving anemograph comprising four counters the readings of which are respectively representative of north, west, south and east signals, means for generating a first train of pulses at a basic repetition rate, means to generate several secondary trains of pulses at different repetition rates that are equal to the basic repetition rates times the sines of different particular angles and rates that are equal to the basic repetition rate times the cosines of the same angles, means responsive to wind direction, and means under the control of said wind direction responsive means for feeding to two selected counters those sine and cosine pulse trains corresponding at any given time to the particular angle that then is closest to the heading of the wind, said selected counters being those corresponding to the quadrant in which the heading of the wind then is located.

8. A resolving anemograph as set forth in claim 7 wherein the means responsive to the wind direction is a wind vane.

9. A resolving anemograph as set forth in claim 7 wherein the means for generating the train of pulses at a basic repetition rate is responsive to absolute wind velocity so that the basic repetition rate is a function of absolute wind velocity.

10. A measuring instrument of the resolving type, said instrument comprising plural different counters the readings of which are representative of orthogonal signals, a first means responsive to a varying angular value, means for electro-mechanically generating different pulse trains having rates that are equal to a basic rate times the sines of different particular angles and rates that are equal to the basic rate times the cosines of the same angles, and means under the control of said first means for feeding to two selected counters those sine and cosine pulse trains corresponding at any given time to the particular angle that then is closest to the angular value to which the first means is responsive, said selected counters being those corresponding to the quadrant in which the angular value then is located.

11. A measuring instrument of the resolving type, said instrument comprising plural different counters the readings of which are representative of orthogonal signals, a first means responsive to a varying angular value, means for electronically generating different pulse trains having rates that are equal to a basic rate times the sines of different particular angles and rates that are equal to the basic rate times the cosines of the same angles, and means under the control of said first means for feeding to two selected counters those sine and cosine pulse trains corresponding at any given time to the particular angle that then is closest to the angular value to which the first means is responsive, said selected counters being those corresponding to the quadrant in which the angular value then is located.

12. A measuring instrument of the resolving type, said instrument comprising plural different counters the readings of which are representative of orthogonal signals, a first means responsive to a varying angular value, a plurality of make and break contacts actuated by a multi-shaft gear train for generating different pulse trains having rates that are equal to a basic rate times the sines of different particular angles and rates that are equal to the basic rate times the cosines of the same angles, and means under the control of said first means for feeding to two selected counters those sine and cosine pulse trains corresponding at any given time to the particular angle that then is closest to the angular value to which the first means is responsive, said selected counters being those corresponding to the quadrant in which the angular value then is located.

13. A measuring instrument as set forth in claim 12 in which the signal path selector switch includes at least one series of adjacent aligned arcuate contact means each of which covers a short angular span.

14. A measuring instrument of the resolving type, said instrument comprising plural different counters the readings of which are representative of orthogonal signals, a first means responsive to a varying angular value, means for generating different pulse trains having rates that are equal to a basic rate times the sines of different particular angles and rates that are equal to the basic rate times the cosines of the same angles, and a signal path selector switch under the control of said first means for feeding to two selected counters those sine and cosine pulse trains corresponding at any given time to the particular angle that then is closest to the angular value to which the first means is responsive, said selected counters being those corresponding to the quadrant in which the angular value then is located.

15. A resolving anemometer comprising four counters the readings of which are respectively representative of north, west, south and east signals, means sensitive to wind direction, means sensitive to wind speed, means controlled by the means sensitive to wind speed to generate a first train of pulses at a basic repetition rate that is a function of wind speed, means to generate several secondary trains of pulses at different repetition rates that are equal to the basic repetition rate times the sines of different particular angles and rates that are equal to the basic repetition rate times the cosines of the same angles, and means controlled by the means sensitive to wind direction for feeding to two selected counters those sine and cosine pulse trains corresponding at any given time to the particular angle that then is closest to the heading of the wind, said selected counters being those corresponding to the quadrant in which the heading of the wind then is located.

16. A resolving anemometer comprising a wind motor, a wind vane, a gear box driven by the wind motor and having plural output shafts which revolve in ratios that are sine and cosine functions of different angles, make and break contacts actuated by said output shafts, means for supplying electric power to said make and break contacts whereby to generate a plurality of trains of electric pulses at rates which are equal to the wind speed times the sines and cosines of different angles, a plurality of different counters the readings of which are representative of orthogonal signals corresponding to the four cardinal points of the compass, a signal path selector switch responsive to the position of the wind vane, and circuit means connecting the make and break contacts to the counters through the signal path selector switch so that pulse trains are fed to the counters as a function of the quadrant of the wind heading and as wind heading resolved components of the wind speed.

17. A resolving anemograph comprising a constant speed motor, a wind vane, a gear box driven by the motor and having plural output shafts which revolve in ratios that are sine and cosine functions of different angles, make and break contacts actuated by said output shafts, means for supplying electric power to said make and break contacts whereby to generate a plurality of trains of electric pulses at rates which are equal to the motor speed times the sines and cosines of different angles, a plurality of different counters the readings of which are representative of orthogonal signals corresponding to the four cardinal points of the compass, a signal path selector switch responsive to the position of the wind vane, and circuit means connecting the make and break contacts to the counters through the signal path selector switch so that pulse trains are fed to the counters as a function of the quadrant of the wind heading and as wind heading resolved components of the motor speed.

References Cited in the file of this patent

UNITED STATES PATENTS

| | | |
|---|---|---|
| 1,342,860 | Mortimer et al. | June 8, 1920 |
| 2,592,583 | Lyon | Apr. 15, 1952 |
| 2,648,980 | Wood et al. | Aug. 18, 1953 |
| 2,942,464 | Sartor | June 28, 1960 |